United States Patent
Haskayne

(10) Patent No.: US 10,266,383 B2
(45) Date of Patent: Apr. 23, 2019

(54) METHODS AND APPARATUS FOR SANITIZING DISPENSERS

(71) Applicant: Lancer Corporation, San Antonio, TX (US)

(72) Inventor: Paul Haskayne, Northwich (GB)

(73) Assignee: Lancer Corporation, San Antonio, TX (US)

( * ) Notice: Subject to any disclaimer, the term of this patent is extended or adjusted under 35 U.S.C. 154(b) by 0 days.

(21) Appl. No.: 15/321,825

(22) PCT Filed: May 18, 2016

(86) PCT No.: PCT/US2016/033023
§ 371 (c)(1),
(2) Date: Dec. 23, 2016

(87) PCT Pub. No.: WO2016/191167
PCT Pub. Date: Dec. 1, 2016

(65) Prior Publication Data
US 2017/0129761 A1    May 11, 2017

Related U.S. Application Data

(60) Provisional application No. 62/165,375, filed on May 22, 2015.

(51) Int. Cl.
| | |
|---|---|
| B67D 1/07 | (2006.01) |
| B05B 15/55 | (2018.01) |
| B08B 3/04 | (2006.01) |
| B08B 3/08 | (2006.01) |
| B08B 9/00 | (2006.01) |
| B08B 9/02 | (2006.01) |

(52) U.S. Cl.
CPC ............. *B67D 1/07* (2013.01); *B05B 15/55* (2018.02); *B08B 3/04* (2013.01); *B08B 3/08* (2013.01); *B08B 9/00* (2013.01); *B08B 9/02* (2013.01); *B67D 2001/075* (2013.01)

(58) Field of Classification Search
None
See application file for complete search history.

(56) References Cited

U.S. PATENT DOCUMENTS

| | | | | |
|---|---|---|---|---|
| 2002/0083543 | A1* | 7/2002 | Geiger | A47J 31/60 15/222 |
| 2006/0169717 | A1 | 8/2006 | Fukushima et al. | |
| 2007/0202234 | A1* | 8/2007 | Ludwig | A23F 5/46 426/580 |
| 2013/0140328 | A1 | 6/2013 | Gates et al. | |
| 2014/0345745 | A1* | 11/2014 | Fahldieck | B67C 3/20 141/9 |

FOREIGN PATENT DOCUMENTS

GB     1517923 A     7/1978

OTHER PUBLICATIONS

ISA/US, International Search Report in PCT/US16/033023 (PCT counterpart to this application).

\* cited by examiner

*Primary Examiner* — Nicole Blan

(57) ABSTRACT

A method and apparatus for sanitizing a dispenser (20) is provided in which a sanitizing cup (10) is coupled to the dispenser after removing a nozzle (22). The sanitizing cup (10) is filled with a sanitizer, and flushed through a check valve (14). Flushing may be accomplished by dispensing water from the dispenser (20) while the sanitizing cup (10) is coupled to the dispenser (20).

10 Claims, 2 Drawing Sheets

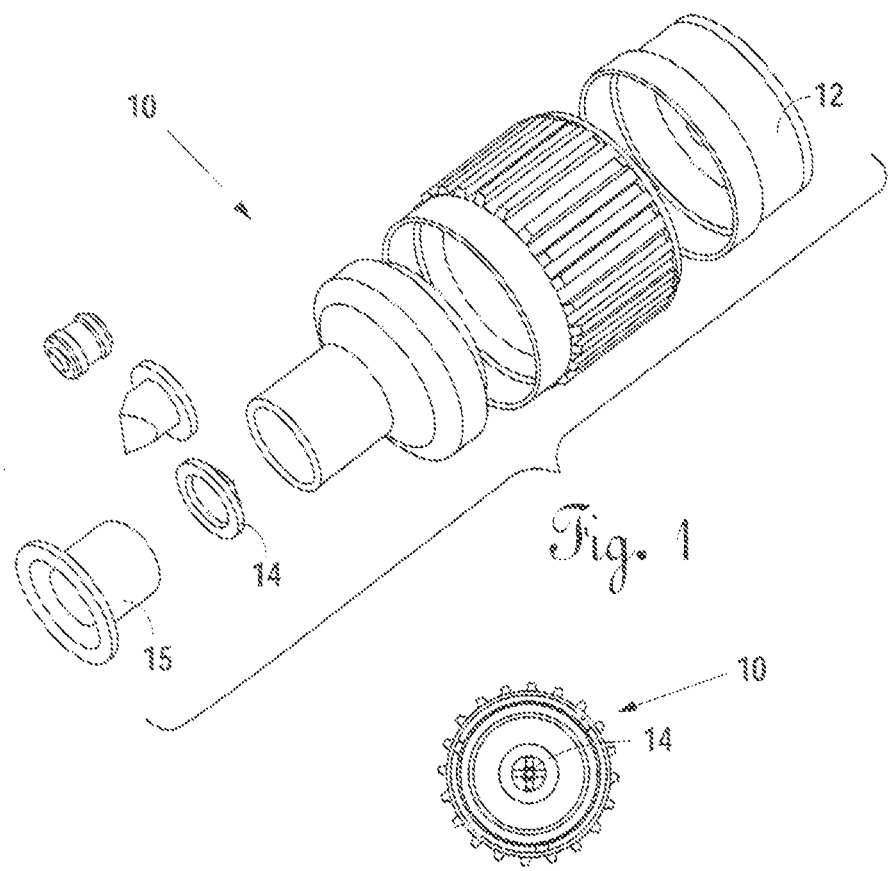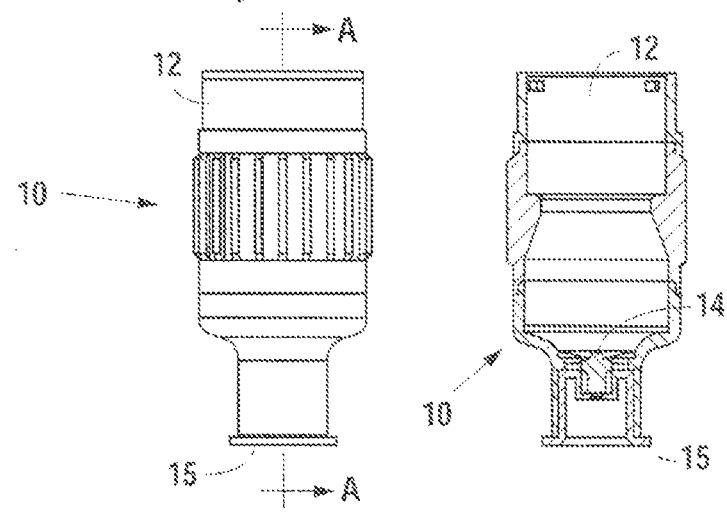

METHODS AND APPARATUS FOR SANITIZING DISPENSERS

TECHNICAL FIELD OF THE INVENTION

This invention relates generally to sanitizing systems, and more particularly to methods and apparatus for sanitizing dispensers.

BACKGROUND OF THE INVENTION

A wide variety of beverage dispensers have been commercialized. In one particular class of dispensers, referred to as post-mix dispensers, beverage concentrates (also referred to as syrups) are mixed with water (plain or soda) to form finished beverages.

As non-limiting examples, post-mix dispensers as used herein include bar guns, counter top, drop-in, and freestanding dispensers, and any other device for dispensing concentrates and water.

In a post-mix dispenser, the concentrate and water are mixed at the time of dispensing. In particular, the concentrate and water usually flow through a nozzle at the time of dispensing, and the mixing occurs in or downstream of the nozzle. The nozzle receives the water and concentrate from outlet ports in fluid communication with the nozzle.

Because of the flow of the concentrate and water, it is important to sanitize the nozzle and the associated parts of the dispenser. Although removing and cleaning the nozzle may be relatively convenient in some designs, cleaning the associated parts of the dispenser, such as the ports through which the water and concentrate flow, is often difficult and overlooked.

Furthermore, this sanitizing problem exists in more than just post-mix dispensers. For example, non-mixing dispensers (such as, for example and without limitation, some milk dispensers, water dispensers, or juice dispensers) and food dispensers have similar issues, in that the dispensing nozzle and associated areas need to be periodically sanitized.

Therefore, a need has arisen for improved methods and apparatus for sanitizing dispensers.

SUMMARY OF THE INVENTION

In accordance with the teachings of the present invention, methods and apparatus for sanitizing dispensers are provided that eliminate or substantially reduce problems associated with prior art systems.

In a particular embodiment, a method for sanitizing a dispenser having a nozzle attached at a receptacle includes disengaging the nozzle from the receptacle, filling a sanitizing cup with a sanitizer, and coupling the sanitizing cup to the dispenser at the receptacle.

This method may further include flushing the sanitizing cup with water by dispensing water from the dispenser while the sanitizing cup is coupled to the dispenser. In a particular method, flushing comprises flushing water through a check valve.

Filling the sanitizing cup may comprise mixing an effervescent sanitizer with water. In a particular method, water is dispensed into the sanitizing cup after it is coupled to the dispenser to activate the sanitizer.

An important technical advantage of the invention is that it provides a sanitizing system and method that can be easily utilized to provide efficient cleansing of dispensers. A particular advantage is that it employs a sanitizing cup that can be coupled to a dispenser at its existing nozzle receptacle. The cup allows for sanitizing parts that are often neglected in cleaning procedures. Furthermore, by providing a check valve, the sanitizing cup may be flushed while coupled to the dispenser, thus enhancing sanitization.

BRIEF DESCRIPTION OF THE DRAWINGS

Reference is made in the description to the following briefly described drawings, which are not drawn to scale, with certain features enlarged for clarity, in which like reference numerals indicate like features:

FIG. 1 is a schematic perspective diagram of one embodiment of a sanitizing cup according to the teachings of the present invention;

FIGS. 2A and 2B are, respectively, side and top views of an assembled sanitizing cup as in FIG. 1;

FIG. 3 is a cross sectional view of the sanitizing cup of FIGS. 1 and 2, taken along line "A" of FIG. 2A.

DETAILED DESCRIPTION OF THE INVENTION

Figure 4:
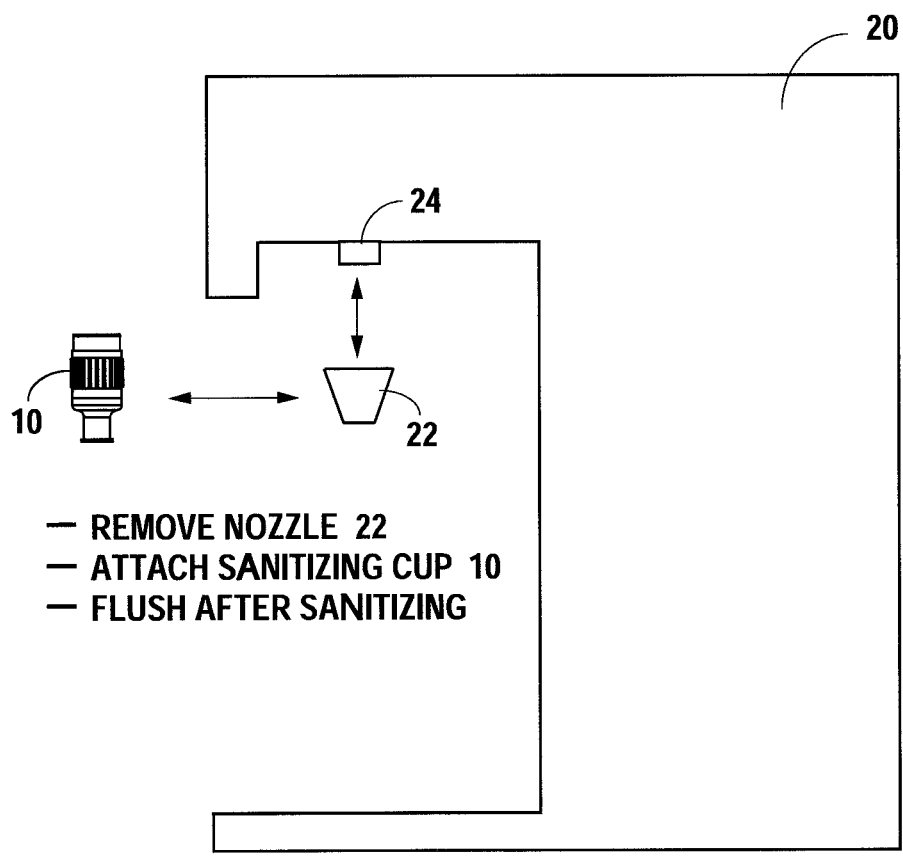
FIG. 4 is a schematic view of a dispenser on which the sanitizing cup of the present invention may be employed.

As shown in FIGS. 1-3, sanitizing cup 10 includes connecting collar 12 and a check valve 14. The cup 10 may include separate parts joined in any suitable manner (such as with a solvent weld). Also, cup 10 may be formed as a single piece. In a preferred embodiment, the cup 10 is formed of plastic.

Check valve 14 may be any suitable valve, including, without limitation, a self-sealing dispensing valve such as disclosed in U.S. Pat. No. 5,213,236, issued on May 25, 1993 to Brown et al., and entitled "DISPENSING VALVE FOR PACKAGING." That patent is herein incorporated, in its entirety, by reference. FIG. 1 shows alternate valves 14, and valve 14 may be held in place with a fitment 15.

In operation, as shown in FIG. 4, a dispenser 20 is sanitized using the present invention by first removing dispensing nozzle 22 from the dispenser 20. Nozzle 22 is removed from dispenser 20 by disengaging it from receptacle 24. The engagement structure of nozzle 22 and receptacle 24 varies depending upon the manufacturer of the dispenser. In a typical, non-limiting example, receptacle 24 and nozzle 22 rotatingly engage. Thus, "receptacle" is used herein in a non-limiting manner, and includes any suitable stricture to and from which a nozzle may be engaged and disengaged. Nozzle 22 may be cleaned in any suitable manner, including, without limitation, by soaking it in a cleaning solution.

Cup 10 is then filled (as used herein, cup 10 is filled if it is full or partially full) with a sanitizing solution, which may include, without limitation, an effervescent cleanser. As non-limiting examples, a sanitizing solution may be premade, or prepared by mixing a sanitizing element with plain or carbonated water, either in or outside the cup 10. In a particular example, cup 10 may be filled with a sanitizing element, such as, without limitation, a tablet or powder or liquid, and then attached to the dispenser. The element may be activated or mixed by dispensing water (plain or carbonated) into the cup 10 after it is attached to dispenser 20, or by adding water (plain or carbonated) before it is attached to dispenser 20. Any of the sanitizing elements or solutions may be referred to herein as sanitizers. The cleanser solution is held in the cup by the check valve 14. Cup 10 is coupled to dispenser 20 by engagement of collar 12 with receptacle 24. To facilitate such engagement, collar 12 includes an engagement structure suitable for engaging with the receptacle 24.

Cup 10 is left on the dispenser 20 for a suitable amount of time. In one approach, the nozzle 22 is removed at the end of the day and soaked overnight. Similarly, the cup 10 is left on dispenser 20 over night. The sanitizing solution in cup 10 cleans the parts of dispenser 20 associated with dispensing, such as the ports from which water and beverage concentrates flow.

Before disengaging the cup 10 from dispenser 20, water (which may be plain or carbonated) is dispensed into the cup 10 to flush out the cup 10. As water is dispensed into the cup 10, pressure increases and check valve 14 opens to allowing the flushing of cup 10.

Some dispensers may not include a water or soda supply, and no cup flushing would be used with such dispensers. Instead, after removing the sanitizing cup, the dispensing parts would be flushed in any suitable manner. With such dispensers, cup 10 need not include a check valve 14, and may be a closed cup. Even with dispensers with water or soda lines, a closed cup (with no check valve 14) may be used, and no cup flushing employed.

The particular embodiments and descriptions provided herein are illustrative examples only, and features and advantages of each example may be interchanged with, or added to the features and advantages in the other embodiments and examples herein. Moreover, as examples, they are meant to be without limitation as to other possible embodiments, are not meant to limit the scope of the present invention to any particular described detail, and the scope of the invention is meant to be broader than any example. Also, the present invention has several aspects, as described above, and they may stand alone, or be combined with some or all of the other aspects.

And, in general, although the present invention has been described in detail, it should be understood that various changes, alterations, substitutions, additions and modifications can be made without departing from the intended scope of the invention, as defined in the following claims.

What is claimed is:

1. A method for sanitizing a dispenser having a dispensing nozzle attachable at a receptacle, comprising:
   disengaging the dispensing nozzle from the receptacle;
   filling a sanitizing cup with a sanitizer; and
   after disengaging the dispensing nozzle from the receptacle, coupling the sanitizing cup to the dispenser at the receptacle, such that the sanitizer contacts the dispenser.

2. The method of claim 1, and further comprising flushing the sanitizing cup with water by dispensing water from the dispenser while the sanitizing cup is coupled to the dispenser.

3. The method of claim 2, wherein flushing comprises flushing water through a check valve.

4. The method of claim 1, wherein filling the sanitizing cup comprises mixing an effervescent sanitizer with water.

5. The method of claim 1, and further comprising dispensing water into the sanitizing cup after it is coupled to the dispenser to activate the sanitizer.

6. The method of claim 5, and further comprising flushing the sanitizing cup with water by dispensing water from the dispenser while the sanitizing cup is coupled to the dispenser.

7. A method for sanitizing a dispenser having a dispensing nozzle attachable at a receptacle, comprising:
   disengaging the dispensing nozzle from the receptacle;
   filling a sanitizing cup with a sanitizer;
   after disengaging the dispensing nozzle from the receptacle, coupling the sanitizing cup to the dispenser at the receptacle; and
   flushing the sanitizing cup with water by dispensing water from the dispenser while the sanitizing cup is coupled to the dispenser.

8. The method of claim 7, wherein flushing comprises flushing water through a check valve.

9. The method of claim 7, wherein filling the sanitizing cup comprises mixing an effervescent sanitizer with water.

10. The method of claim 7, and further comprising dispensing water into the sanitizing cup after it is coupled to the dispenser to activate the sanitizer.

* * * * *